Patented Jan. 16, 1945

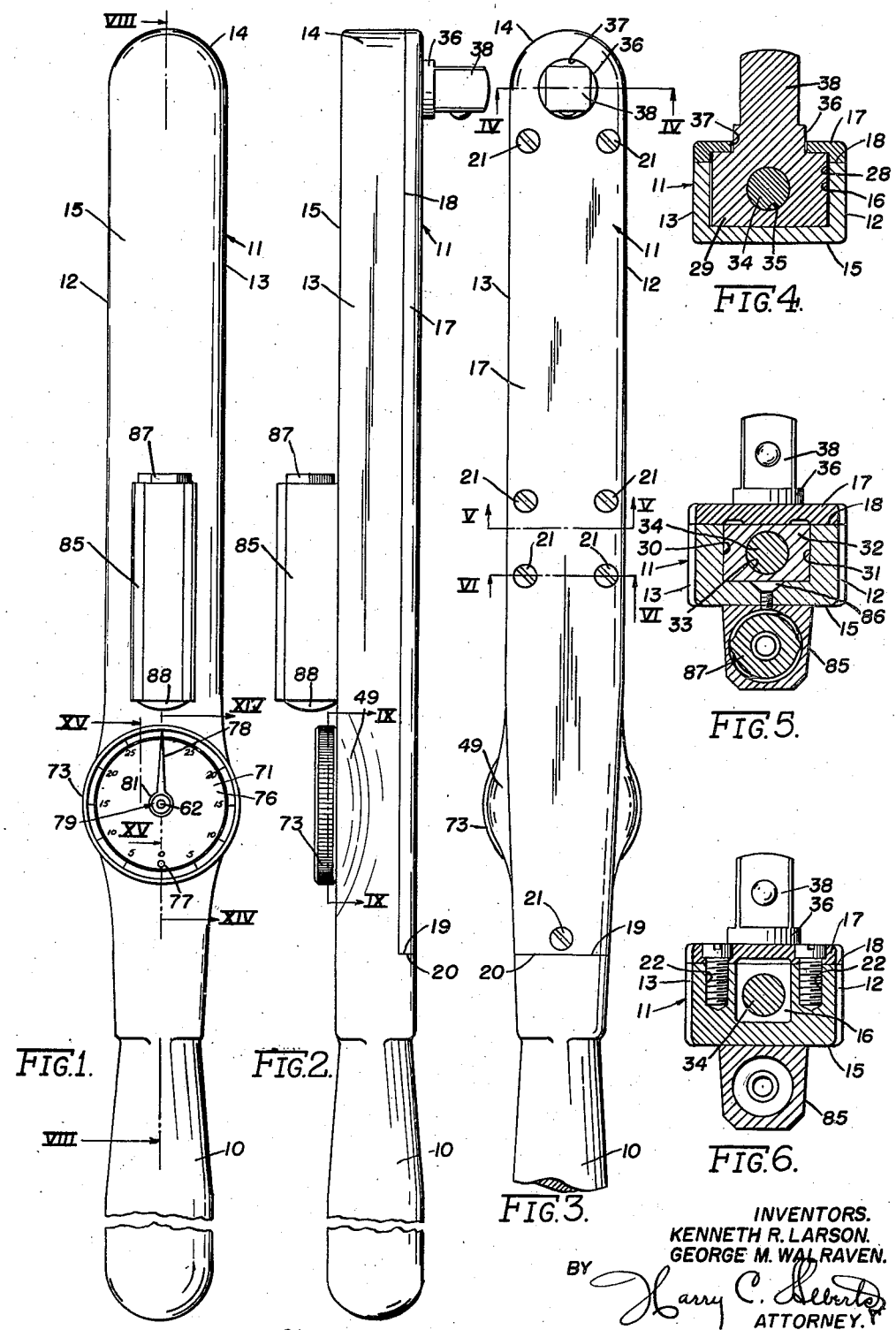

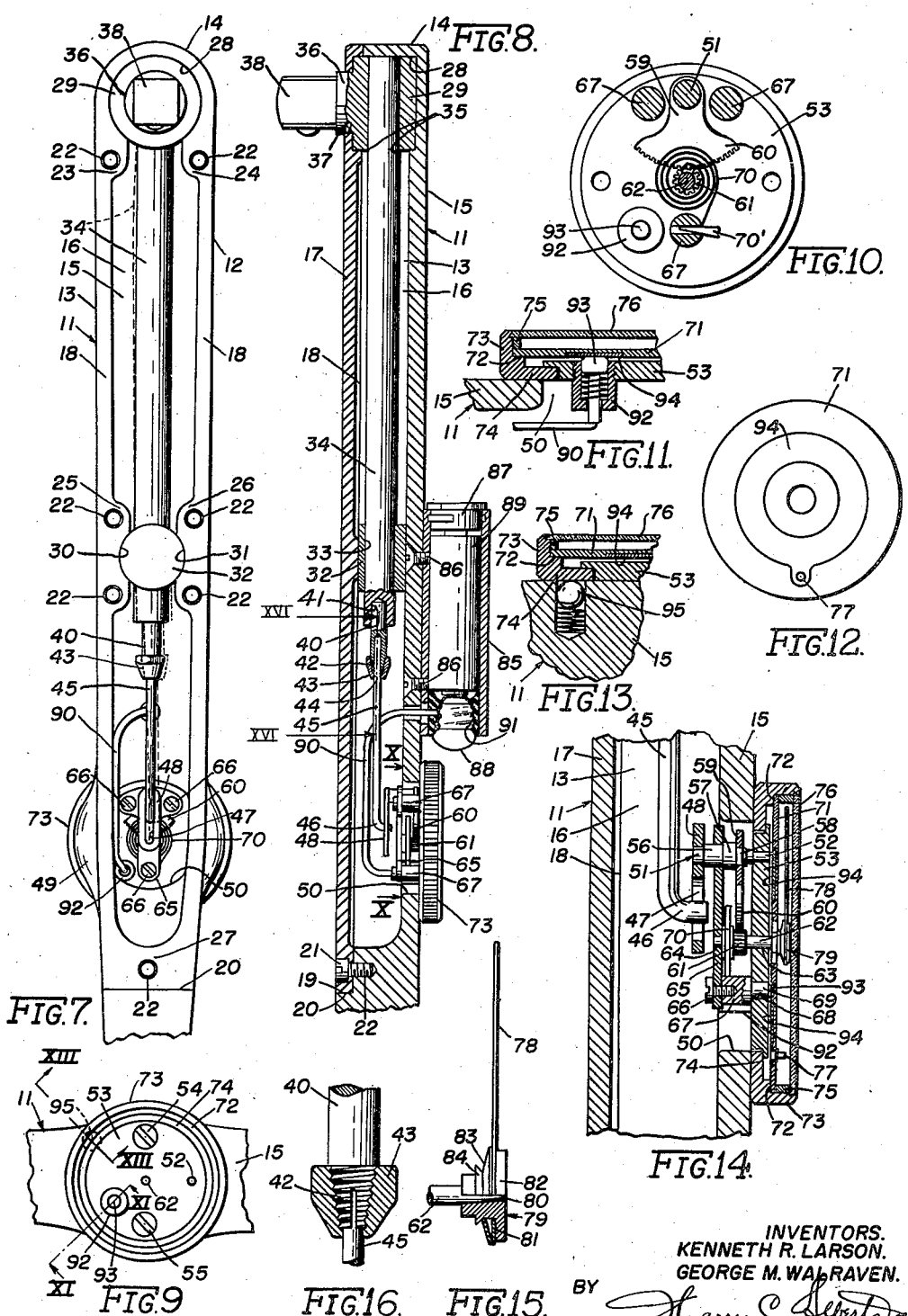

2,367,224

UNITED STATES PATENT OFFICE 2,367,224

TORQUE WRENCH

Kenneth R. Larson, Des Plaines, Ill., and George M. Walraven, Kenosha, Wis., assignors to Snap-On Tools Corporation, Kenosha, Wis.

Application January 14, 1941, Serial No. 374,362

17 Claims. (Cl. 73—139)

This invention relates to turning devices and more particularly to nut turning wrenches, although certain features thereof may be employed with equal advantage for other purposes. This application is a continuation-in-part of pending application Serial Number 317,226 and filed February 5, 1940.

It contemplates more especially the provision of a simple, dependable, accurate and compact torque wrench of the type described in the pending sole patent application Serial Number 317,226 and filed February 5, 1940 which is being substituted by this joint application for Letters Patent.

Numerous types of torque turning wrenches have heretofore been proposed, but these have not proven entirely satisfactory owing to their substantially increased bulk over ordinary nut turning tools and their failure to render a dependable and uniform service in gauging the torque applied in any nut or other fastening expedient such as a screw. There has been a long felt want for a torque turning tool that is simple, compact, dependable, accurate, and instantly indicates the desired tension or registers any predetermined or pre-set tension or torque applied or to be applied to a nut or other fastening expedient.

Then, too, great difficulty has been encountered in maintaining the indicating mechanism in good condition of operation due to the abuses occasioned during the normal use in nut turning operations. Should the applied torque be released by rupture in the fastener or by accidental release at the instance of the attendant, the recoil on the dial mechanism and indicator is so rapid as to normally cause structural failures therein. This has been eliminated in the preferred embodiment of the present invention by the use of a clutch mount for the dial indicator that permits free slippage with reference to the dial mechanism and the provision of a beam extension which is highly flexible, resilient and possessed of only sufficient rigidity to overcome the load of displacing the measuring instrumentalities connected thereto. Consequently, the severe stress and strains resulting from any back-lash action, will be absorbed for the most part by the flexing of the beam extension and thus protect the measuring instrumentalities in any type of beam device under such abnormal conditions of abusive operation.

Then, too, full advantage of utilizing a torque indicating tool is not realized by a mere dial indicator, since in production operations such would require the discretion and judgment of the attendant as well as entail some time in observing the indicator. With the teachings of the present invention, this disadavntage is avoided by providing signal means that are energized at the very instant that there is a torque commensurate with the setting of said calibrated indicating means to close the circuit to an electrically operated signal. Such signal means in conjunction with an extremely sensitive switch that is rendered responsive to the indicator, momentarily registers the predetermined force that is being applied in turning operations without any careful observation or entailment of any time. This is also conducive to uniform results in the turning of nuts and other fastening expedients with a turning tool of the type mentioned both for test and production purposes.

One object of the present invention is to simplify the construction and improve the operation of devices of the character mentioned.

Another object is to provide a dial indicator clutch mount that affords slippage between the dial mechanism and the indicator to preclude damage thereto should the applied torque be released by rupture in the fastener or by accidental release at the instance of the attendant.

Still another object is to provide a turning tool having torque indicating means in conjunction with an improved shock absorbing actuator therefor for predetermining the torque applied in any selected turning operation.

A further object is to provide a torque wrench having an improved measuring indicator actuator that enables ready adjustment to insure accurate measurements without entailing any appreciable time, labor or expense.

A still further object is to provide signal means in conjunction with a torque wrench that is rendered operative responsive to applying force commensurate with any adjusted torque to which the indicator is set.

Suitable a further object is to provide accurate means for energizing signal means responsive to the application of force with a wrench or other turning tool commensurate with the setting of calibrated indicating means.

An additional object is to provide a novel combination of indicating elements in association with a wrench or other turning tool so as to signal the application of a predetermined force in the turning operation thereof without unduly encumbering the turning tool operation.

Other objects and advantages will appear from the following illustrative embodiment of the present invention.

In the drawings:

Figure 1 is a front view in elevation of a wrench and dial embodying features of the present invention.

Figure 2 is a side view in elevation of a wrench and dial embodying features of the present invention.

Figure 3 is a rear view in elevation of a wrench and dial embodying features of the present invention.

Figure 4 is a sectional view taken substantially along line IV—IV of Figure 3.

Figure 5 is a sectional view taken substantially along line V—V of Figure 3.

Figure 6 is a sectional view taken substantially along line VI—VI of Figure 3.

Figure 7 is a bottom view of the wrench shown in Figure 3 with the bottom plate removed to illustrate the inner construction, the handle being broken away for convenience.

Figure 8 is a sectional view taken substantially along line VIII—VIII of Figure 1.

Figure 9 is a sectional view taken substantially along line IX—IX of Figure 2.

Figure 10 is a sectional view taken substantially along line X—X of the dial mechanism shown assembled in Figure 8.

Figure 11 is a sectional view taken substantially along line XI—XI of Figure 9.

Figure 12 is the bottom view of the calibrated dial.

Figure 13 is a sectional view taken substantially along line XIII—XIII of Figure 9.

Figure 14 is a sectional view taken substantially along line XIV—XIV of Figure 1.

Figure 15 is a fragmentary sectional view of the pointer reset clutch assembly taken substantially along line XV—XV of Figure 1.

Figure 16 is a fragmentary sectional view in elevation taken substantially along line XVI—XVI of Figure 8.

The structure selected for illustration comprises a solid handle member 10 of standard construction having an elongated chambered wrench shank or body 11 cast or otherwise shaped to present inclined side walls 12 and 13 to terminate in a semi-circular extremity 14. The handle 10 with its chambered body 11 is preferably though not essentially cast from an aluminum alloy so as to possess the desired strength and lightness for convenience and manipulation in nut turning as will appear more fully hereinafter. It will be observed that the handle shank or body 11 consists of the inclined side walls 12—13 which converge in the direction of the handle 10 with an intermediate body wall 15 formed integral therewith to define an elongated chambered interior 16.

The shank 11 is normally covered by a solid plate 17 that is shaped to conform with the configuration of the body wall 15 to confront therewith and serve as a complement of an open edge 18 that extends around the side walls 12—13 and their semi-circular extremity 14, the face plate 17 being shaped to correspond therewith and its lower edge 19 cooperates with and abuts against the shoulder 20 (Figures 2 and 7) formed on the shank 11 proximate to the solid handle 10. A plurality of threaded screw fasteners 21 project through apertures in the plate 17 to engage correspondingly threaded bores 22 in the edge 18 that extends along the side walls 12—13 of the handle shank or body 11 and end 14, thereby enclosing the chamber 16 and confining the torque resisting instrumentalities and measuring instrumentalities to be described hereinafter.

It will be noted that the handle shank or body 15 and especially the inclined side walls 12—13 are reinforced in the region of the threaded bores 22 by increasing the thickness of the cast metal as at 23—24, 25—26 and 27 which is a solid portion of the handle shank 11 proximate to the lower extremity of the chamber 16 provided therein. The semi-circular head 14 of the body 11 is provided with a circular recess 28 corresponding in curvature therewith and measured to receive an accurately fitting revoluble member 29 of corresponding shape and size for rotary association therein. It is to be noted that the circular recess 28 communicates with the chamber 16 in the handle shank 11, and the entire head portion is reinforced by the enlarged thicknesses 23—24 of the side walls 12—13 in the region of the recess 28.

Now, then, the enlarged thicknesses 25—26 of the side walls 12—13 are approximately along a transverse median line of the handle 10 and its contiguous shank or body 11, and these are circularly recessed to provide interrupted arcuate portions 30 and 31 which receive a cylindrical bearing or bushing 32 of pressed or other suitable material. The bushing 32 is provided with a diametrically disposed bore 33 which freely receives a closely fitting cylindrical rod 34 that extends therethrough from the revoluble member 29 to serve as a torque resisting beam.

To this end, the cylindrical elongated rod 34 is, in this instance, of uniform diameter and projects diametrically through the revoluble member 29 as at 35 for fixed engagement therewith to constitute a single acting unit or member. As shown, the revoluble member 29 has a transversely disposed cylindrical extension 36 which is journalled in a correspondingly shaped aperture 37 provided in the cover plate 17. The cylindrical extension 36 is, in this instance, formed integral with the revoluble member 29 and terminates beyond the cover plate 17 in a polygonal shank 38 for registry with a correspondingly shaped and sized recess formed in the wrench socket or other turning implement as commercial practice may dictate for use therewith.

It has been found more desirable, however, from a manufacturing standpoint to terminate the elongated cylindrical beam 34 just beyond the floating mount 32 thereof and join therewith a smaller elongated clutching pin 40 of comparatively smaller diameter for pressed fitting axial engagement in an end bore 41 provided in the free extremity of the elongated beam 34. The clutching pin 40 is pressed in the end axial bore 41 of the beam 34 to effect an integral joinder therewith. As shown, the clutching pin 40 terminates in a conical longitudinally slitted extremity 42 for the reception of a correspondingly tapered and threaded nut 43 thereover to vary the size of the axial bore 44 provided in the clutching pin 40.

To this end, an extension rod 45 projects within the bore 44 of the clutching pin 40 for frictional engagement therein by means of the tightening nut 43 to effect the rigid connection of the beam extension rod 45 thereto which can be readily replaced should occasion demand or such become impaired through abuse in nut turning operation. It should be noted that the beam 34 together with its reduced rod extension 45 would function exactly the same even though these were turned or otherwise shaped from a single unit; however, such construction would be somewhat more expensive from a production standpoint than the pressed co-axial fitting relationship between the rods 34 and 45 serving as a floating beam for the mount 32. With this arrangement, the rod extension 45 may be extended or retracted within the axial bore 44 of the clutching pin 40 to enable longitudinal adjustment thereof relative to the elongated clutching pin 40 and the indicator mechanism to be hereinafter described. The longitudinal adjustment of the rod extension 45 will vary the extent to which the dial mechanism is actuated or displaced responsive to a predetermined flex imparted to the beam 34 that responds to the rotary displacement of the revoluble member; consequently, this effects the extent of displacement of the indicator mechanism so adjustments can be made to insure accurate readings for any predetermined flex and hand turning load.

The reduced rod 45 has an outwardly curved extremity 46 which projects transversely to constitute an angularly offset extremity for registry in a longitudinally elongated slot 47 provided in a lever 48 that is disposed in the chamber 16 which has an outwardly flaring dial housing 49 in this region. The dial housing 49 is formed integral with the wrench body 11 and provides a communicating opening 50 with the chamber 16 for the confinement of the dial instrumentalities which will be described more fully hereinafter. Any back-lash occasioned by the abrupt accidental release of the turning load would ordinarily jar, impair and render permanently defective the measuring instrumentalities.

This can be largely overcome by the beam extension 45 which is highly flexible, resilient and possessed of only sufficient rigidity to actuate the measuring instrumentalities connected thereto. Consequently, the severe stress and strains resulting from any back-lash action, will be absorbed for the most part by the flexing of the beam extension 45 and thus protect the measuring instrumentalities in any type of beam device under such abnormal conditions of abusive operation. Even though there was an abrupt release of load, therefore, the back-lash in the aforesaid structure would be negligible and the actuator rod 34—40—45 would not be called upon to withstand any appreciable back-lash shock which could, however, be absorbed by the resilient beam extension 45 which is preferably constructed from small diameter spring steel wire. The steel spring wire 45 is sufficiently rigid to carry the comparatively small load involved in actuating the indicator instrumentalities without any flex therein and yet sufficiently resilient to absorb any shock created in the abnormal operation of the turning head or revoluble member 29.

It is to be noted that the lever 48 is fixed to a stub shaft 51 having a reduced extremity 52 journalled in a circular peripherally flanged bottom plate 53 constituting a part of the indicator casing. The bottom plate 53 constitutes a part of the indicator casing and is fixed to the wall 15 of the wrench body 11 by means of threaded studs 54—55. The shaft 51 has a series of concentric peripheral shoulders 56—57—58 terminating in the reduced end 52 over which is pressed an apertured arm 59 of a gear segment 60 to abut against the shoulder 58. The gear segment 60 meshes with a pinion 61 mounted on a stub shaft 62 which is journalled in axial aligned bores 63 and 64 provided in the casing bottom plate 53 and a bracket plate 65 mounted on the bottom plate 53 in parallel spaced relation therewith.

The bracket plate 65 is, in this instance, substantially T-shaped and is held or mounted in spaced parallel relation to the indicator casing bottom 53 by means of threaded studs 66, in this instance three, projecting through the extremities thereof for engagement with correspondingly threaded spacer collars 67 fitted in bores 68 (Figure 14) formed in the bottom indicator casing plate 53. It should be observed that the fastening collars 67 are provided with reduced collar shanks 69 serving as spacers above the bottom plate 53, thereby maintaining the T-shaped bracket 65 in spaced relation with the indicator casing bottom plate 53. The bracket 65 also serves as a bearing for the shoulder portion 56 of the lever shaft 51 to insure the proper mounting of the gear segment 60 and maintaining the meshing engagement thereof with the pinion 61.

A spiral spring 70 envelops the stub shaft 62 on which the pinion 61 is mounted or integrally formed, to normally urge or return the indicator instrumentalities to an initial position. It should be noted that one extremity of the coil spring 70 is mounted in a transverse aperture provided in the post 67 wherein a wedge 70' has been driven to establish the effective anchor thereof (Figure 10). A calibrated dial 71 is mounted and rests upon the peripheral shoulder 72 formed in the cylindrical collar 73 that terminates in an annular base plate 74 sized to cooperate with and serve as a complement of the flanged bottom plate 53 to permit relative rotation therebetween.

It is to be noted that the peripheral flange of the bottom plate 53 extends along the top surface thereof so as to retain the collar 73 in position against withdrawal or removal, but permitting the relative rotation to the bottom plate 53 to pre-set or re-set the dial 71 for purposes that will appear more fully hereinafter. In order that the dial 71 will rotate with and serve as a fixed unit of the collar 73, a resilient band 75 is disposed thereon within the peripheral edge thereof to maintain thereon a glass or other transparent crystal 76 fitted to the indicator casing 73 to preclude obstruction and access of foreign substances to the dial mechanism, thereby avoiding the entrance of foreign substances therein which would impair the accuracy and operation of the indicating instrumentalities.

It will be observed that the dial 71 is calibrated in foot pounds or foot inches (Figure 1) and a metallic pin 77 is mounted therein in a position calibrated at zero. To designate the degree of flex imparted to the beam 34 during the turning operation and converting such into foot pounds or foot inches depending upon the calibration of the dial 71, a pointer 78 is mounted on a hub 79 that has an axial bore for pressed fitted engagement with a conical extremity 80 of the pinion shaft 62. The pointer 78 terminates in an enlarged apertured extremity 81 that rests on a flange 82 comprising an integral part of the hub 79. A dished washer 83 is disposed over the reduced portion of the hub 79 to bear against the apertured extremity 81 of the pointer 78 to effect frictional contact therewith.

The reduced portion of the hub 79 is then spread as at 84 to present an overlying flange that serves to retain the dished washer 83 in assembled relation with and frictionally against the pointer end 81 so as to enable relative rotary displacement with the hub 79 that rotates in unison with the pinion shaft extremity 80. It is to be noted that the overlying flange 84 is deformed from the material of the hub 79 after the spring disc 83 is placed in position against the apertured extremity 81 of the pointer 78. It will be apparent, therefore, that the pointer 78 will rotate with the hub 79 and the pinion shaft extremity 80 whenever there is no obstruction in the path of the pointer 78; however, any rotation of the dial 71 with its casing 73 will cause the pin 77 to engage the pointer 78 and effect the rotation of the latter therewith to enable pre-setting the dial and having contact established therebetween whenever any predetermined flex has been imparted to the beam 34.

Signal means are provided to indicate when the force applied in the operation of the nut turning flexes the beam 34 to the extent commensurate with the pre-setting of the dial 71 to the desired foot pounds which vary for any particular occasion. To this end, an electric light signal has been attached to respond to the pre-setting of the dial 71 and the turning of the indicator 78 for an extent equivalent to the desired flex imparted to the beam 34. In the present embodiment, the signal means comprises an elongated tubular housing 85 that is attached to the body 11 by resort to internally projected studs 86 (Figure 8).

The signal housing 85 has a threaded retainer closure 87 provided at one end thereof and an electric bulb 88 in the other end that contacts a battery 89 confined in the signal housing 85. Consequently, the signal housing 85 is mounted on the body 11 together with the casing of the battery 89. An insulated electric lead or conductor 90 extends from the insulated socket 91 of the bulb 88 to a terminal housing 92 mounted to the bottom plate 53 of the indicator casing 73. The conductor 90 terminates in a spring impelled detent 93 which projects through the bottom plate 53 and effects contact with a metallic ring 94 through which the dial pin 77 extends.

It is to be noted that the dial 71 is preferably though not essentially made from insulation material or for that matter may be enamelled to provide an insulation surface so that it will not serve as an electrical conductor except through the pointer 78 when the latter engages the pin 77 and completes the circuit through the spring impelled detent 93, the body 11, and the battery 89 to the bulb 88. With the use of an enamelled dial 71, the annular ring 94 is provided by cutting through the enamel to afford an electrical contact with the detent 93 so that the circuit will be completed through the body of the dial 71. In either case, the pin 77 contacts the annular ring 94 or the bare surface depending upon whether the dial 73 is of insulation material or has a coated enamelled surface to serve the equivalent purpose relative to the indicator casing 73. Consequently, when the dial 71 with its casing 73 has been rotated so that the pointer 78 is set for any predetermined unit of force, for example one hundred foot pounds, the nut turning load will flex the beam 34 and thus move the pointer 78 until the latter engages the pin 77 to complete the circuit through the electric light bulb 88, thereby energizing the signal and indicating that the pre-set amount at which the dial 78 has been adjusted, has been reached and no further turning movement shall be imparted through the wrench body 11.

Further, the provision of the frictional clutch mount 83 for the pointer 78, enables the latter to be turned to any predetermined initial position before the dial has been pre-set to any desired reading so that the wrench handle 10 can be manipulated from any position to gain accessibility and still have the dial 71 in position for convenient reading. In other words, the dial 71 cannot have its initial zero reading in longitudinal alignment with the wrench body 11, but such may be rotatively displaced to be read from any other position depending upon the position in which the wrench must be used to gain accessibility to the nut or other fastener.

In order to preclude free rotation of the indicator with its casing 73, a spring impelled detent 95 is mounted in the wrench body 11 (Figure 13) for frictional contact with the bottom flange 74 of the dial casing 73. Consequently, relative rotation of the dial 71 with its casing 73 will be possible only upon the direct application of turning force thereto and no rotary displacement will take place through accident or free movement such as used in effecting the turning of the fastener.

The manipulation of the handle 10 by the attendant and imparting a turning movement after the head shank 38 engages the fastening expedient such as a nut, will flex the beam 34 in one direction or the other depending upon the direction of the applied force to the handle 10, and this flexing will vary proportionately to the force applied to flex the beam 34 as indicated by the dotted outline thereof in Figure 7. The beam 34 together with its reduced extension 45 is preferably turned or otherwise shaped from a high quality steel alloy that has limited flexibility and a comparatively high elastic limit so that it will uniformly flex and return to its initial position to provide accurate readings within the range and elastic limit thereof without variation within ordinary requirements.

Any number of high quality steel alloys may be used for this purpose, and by way of example the beam 34 and its reduced extension 45 can be advantageously constructed from an oil hardened tool steel. It should be noted that the beam 34 flexes between the head 29 and the rotary mount 32, and that the movement of the rod extension 45 is one occasioned by the deflection that is a result of the flexing in the beam 34 rather than within the rod extension 45 itself. The reading of the dial reflects the deflection in the beam 34 and nothing other than mere displacement of the rod extension 45.

It will be observed from the foregoing description of an illustrative embodiment constituting the subject matter hereof, that clockwise rotation imparted to the handle 10 (viewed from Figure 1) during the engagement of the polygonal shank 38 with a nut or other fastening implement, will cause flexing of the beam 34 as shown in the dotted outline in Figure 7. This action will cause slight longitudinal displacement of the beam 34 relative to its mount 32 and the latter will simultaneously rotate for a fractional extent to facilitate the displacement of the beam ends 34—40 in opposite directions responsive to the flexing thereof. The flexing of the beam 34—40 will correspondingly displace the spring 70 which is connected to indicator instrumentalities calibrated to the selected size or capacity of the beam 34—40.

Then, too, if should be appreciated that the attachment of the indicator casing 73 with its bottom plate 53 on the body wall 15 always maintains the indicator instrumentalities in operative connection with the beams 34—45, thereby rendering the cover plate 17 removable for inspection, replacement, and cleansing purposes without interfering with the setting and operative connection between the beam extension 45 and the indicator lever 48.

The operative connection of the indicator lever 48 to the terminal free end of the beam 34—45 also provides for the measurement of the torque at the point of maximum deflection of the torque resisting beam 34, thereby affording more accurate measurements than would otherwise be possible. As stated supra, the dial 71 together with its casing 73 can be rotated to any desired position best suited to the view of the attendant and the pre-setting thereof to any selected maximum torque to be applied to the fastening expedient, will serve to energize the electric light signal bulb 88 when the pointer 78 engages the pin 77 to close the circuit to the battery 89.

With the arrangements of parts above described, a very simple, dependable and accurate torque resisting and measuring beam 34 has been incorporated into a wrench or other turning device without sacrificing compactness or encumbering the turning tool with any objectionable weight. It will be observed that should the applied torque be released by rupture in the fastener or by accidental release at the instance of the attendant, the recoil action on the dial and its internal mechanism will not necessarily effect the dial indicator because of the slippage made possible in the mounting thereof to the dial shaft.

Should this occur, the recoil will take place without impairment to the dial indicator which will slip relative to its mounting shaft without any damage or impairment to either the dial mechanism or the indicator. This is advantageous independent of the dial indicator resetting feature for convenience in reading as well as enabling presetting for signal indication at any predetermined torque, since the dial indicator clutch mount affords the rapid recoiling of the dial mechanism without any effect upon the dial indicator.

The term "pre-set" or "pre-setting" conveys the meaning (1) that the dial 71 has been first rotatively positioned so that its pin 77 has been circumferentially spaced from the pointer 78 for any selected maximum torque to be applied to the fastening expedient whereupon the signal 88 will be energized or (2) the dial 71 together with its casing 73 can be rotated to any desired position best suited to the view of the attendant. The term "re-set" or "resetting" is used to convey the meaning that the dial pointer 78 can be manually returned to any initial pre-set reading or to "zero," this adjustable feature also compensates for any variation due to play in the moving parts or production differences in the indicating mechanism, or to enable the use of the wrench for straight readings without employing the signal 88.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:
1. In a torque wrench, the combination with a handle member, of a turning head member operatively connected to said handle member, torque resisting means interposed between said handle member and said turning head member, calibrated indicating means operatively connected to said resisting means to measure the turning load on said torque resisting means, said calibrated indicating means including instrumentalities for operating a shaft, a dial rotatively mounted on said handle member relative to said shaft to enable calibration and facilitate reading of said indicating means, said dial being normally stationary on said handle member, a pointer frictionally mounted on said shaft for rotation relative to or with said shaft, and a pin anchored in said dial to engage said pointer for rotative resetting responsive to rotary dial displacement.

2. In a wrench head and handle having a calibrated indicator responsive to the torque applied in turning a fastener therewith, the combination with instrumentalities for operating a shaft, a calibrated dial mounted on said handle for rotation relative to said shaft, a pointer on said shaft for rotation relative to or with said shaft, a dial ring casing enclosure attached to said dial, and a pin anchored on said dial for rotating said pointer relative to said shaft responsive to the rotation of said casing enclosure.

3. In a wrench head and handle having a calibrated indicator responsive to the torque applied in turning a fastener therewith, the combination with instrumentalities for operating a shaft, a calibrated dial mounted on said handle for rotation relative to said shaft, a pointer frictionally mounted on said shaft for rotation relative to or with said shaft, a dial ring enclosure attached to said dial, a pin anchored to said dial for engaging said pointer to effect rotative resetting of said pointer relative to said shaft responsive to the rotation of said casing enclosure with said dial, signal means associated with said handle member, an electrical energy source for said signal means, and an electrical circuit including said dial pin and said pointer to energize said signal means when said dial pin and pointer contact to close said electrical circuit responsive to applying a predetermined torque to said wrench head and handle commensurate with the presetting of said pointer on said dial.

4. In a wrench head and handle having a calibrated indicator responsive to the torque applied in turning a fastener therewith, the combination with instrumentalities for operating a shaft, a calibrated dial mounted on said handle for rotation relative to said shaft, a pointer frictionally mounted on said shaft for rotation relative to or with said shaft, and a pin anchored in said dial to engage the free extremity of said pointer for rotative resetting responsive to rotary dial displacement.

5. In a wrench head and handle having a calibrated indicator responsive to the torque applied in turning a fastener therewith, the combination with instrumentalities for operating a shaft, a calibrated dial mounted for rotation on said handle relative to said shaft, a casing for said dial journalled on said wrench for effecting the rotary support thereof relative to said shaft, a pointer mounted on said shaft, and means on said dial in the path of said pointer for resetting the latter responsive to turning said dial casing.

6. In a torque wrench, the combination with a handle member, of a work turning member operatively connected to said handle member, torque resisting means interposed between said handle member and said work turning member, calibrated measuring means operatively connected to said torque resisting means to measure the turning load transmitted by said work turning member to said torque resisting means, said calibrated measuring means including a dial and indicator mounted on said handle member, said dial and indicator being both mounted for movement relative to each other and to said handle member, and means for presetting the position of said dial and indicating means relative to each other and said handle member without influencing the operative connection of said calibrated means with said torque resisting means.

7. In a torque wrench, the combination with a handle member, of a work turning member operatively connected to said handle member, torque resisting means interposed between said handle member and said work turning member, calibrated measuring means operatively connected to said torque resisting means to measure the turning load transmitted by said work turning member to said torque resisting means, said calibrated measuring means including a dial and indicator mounted on said handle member, said dial and indicator being both mounted for movement relative to each other and to said handle member, and flexible yielding means interposed between said torque resisting means and said calibrated measuring means to unyieldingly transmit normal turning loads therebetween and to yield responsive to the transmission of abnormal turning or shock loads, thereby avoiding injury to said calibrated measuring means.

8. In a torque wrench, the combination with an elongated wrench body member, of a handle member extending from one end of said body member and of substantially lesser length then said body member, a work turning member operatively connected to said body member proximate to the other end thereof, torque resisting means between said handle member and said work turning member in said body member, calibrated measuring means operatively connected to said torque resisting means to measure the work turning load responsive to applying force to said handle member, said calibrated measuring means including a dial and a pointer mounted for movement simultaneously or relative to each other, and means responsive to said dial movement means for resetting said pointer with said dial without influencing the operative connection between said torque resisting means and said calibrated measuring means.

9. In a torque wrench, the combination with a handle member, of a turning head member operatively connected to said handle member, torque resisting means interposed between said handle member and said turning head member, calibrated measuring means operatively connected to said torque resisting means to measure the load on said turning head member, said calibrated measuring means including instrumentalities for operating a shaft, indicating means on said shaft, a dial and casing mounted for rotation relative to said shaft about their common axis to enable resetting and facilitate reading of said indicating means, said dial and casing being normally stationary on said handle member relative to said shaft for rotation independently thereof, said indicating means being mounted on said shaft for rotation relative to or with said shaft, and means on said dial to enable corresponding or relative movement between said dial and indicating means responsive to rotating said casing.

10. In a torque wrench, the combination with a handle member, of a turning head member operatively connected to said handle member, torque resisting means interposed between said handle member and said turning head member, calibrated measuring means operatively connected to said torque resisting means to measure the load on said turning head member, said calibrated measuring means including instrumentalities for operating a shaft, indicating means on said shaft, a dial casing rotatively mounted on said handle member for rotation relative thereto about the common axis of the shaft and casing to enable resetting and facilitate reading of said indicating means, said dial and casing being normally stationary on said handle member relative to said shaft for rotation independently thereof, said indicating means being mounted on said shaft for rotation relative to or with said shaft, and a pin on said dial in the path of said indicating means to enable relative movement between said indicating means and shaft responsive to rotating said casing.

11. In a torque wrench, the combination with a handle member, of a turning head member operatively connected to said handle member, torque resisting means interposed between said handle member and said turning head member, calibrated measuring means operatively connected to said torque resisting means to measure the load on said turning head member, said calibrated measuring means including instrumentalities for operating a shaft, indicating means on said shaft, a dial casing rotatively mounted on said handle member for rotation relative thereto about the common axis of the shaft and casing to enable resetting and facilitate reading of said indicating means, said dial and casing being normally stationary on said handle member relative to said shaft for rotation independently thereof, said indicating means being mounted on said shaft for rotation relative to or with said shaft, and flexible yielding means interposed between said torque resisting means and said calibrated measuring means to unyieldingly transmit normal turning loads therebetween and to yield responsive to the transmission of abnormal turning or shock loads, thereby avoiding injury to said calibrated measuring means.

12. In a torque wrench, the combination with a handle member, of a work turning head member in said handle member, torque resisting means interposed between said handle member and said work turning head member, said torque resisting means including an elongated rod anchored at one extremity thereof to said work turning head member, a highly flexible axial extension on the other extremity of said rod, and torque indicating means operatively connected to the free extremity of said highly flexible rod extension which is displaced responsive to applying force to said handle means, said flexible rod extension being sufficiently inflexible to transfer normal loads on said work turning head member to said torque indicating means and sufficiently flexible to yield responsive to abnormal loads to serve as shock absorbing means, said torque indicating means including instrumentalities for operating a shaft, a dial rotatively mounted on said handle member for movement relative to said shaft to enable calibration and facilitate reading of said indicating means, said dial being normally stationary on said handle member, and a pointer mounted on said shaft for rotation with said shaft.

13. In a torque wrench, the combination with a handle member, of a work turning head member journalled in said handle member, torque resisting means interposed between said handle member and said work turning head member, said torque resisting means including an elongated rod anchored at one extremity thereof to said work turning head member, a highly flexible axial extension on the other extremity of said rod, torque indicating means operatively connected to the free extremity of said highly flexible rod extension which is displaced responsive to applying force to said handle means, said flexible rod extension being sufficiently inflexible to transfer normal loads on said work turning head member to said torque indicating means and sufficiently flexible to yield responsive to abnormal loads to serve as shock absorbing means, said torque indicating means including instrumentalities for operating a shaft, a dial rotatively mounted on said handle member for movement relative to said shaft to enable calibration and facilitate reading of said indicating means, said dial being normally stationary on said handle member, and a pointer frictionally mounted on said shaft for rotation relative to or with said shaft.

14. In a torque wrench, the combination with a handle member, of a work turning head member journalled in said handle member, torque resisting means interposed between said handle member and said work turning head member, said torque resisting means including an elongated rod anchored at one extremity thereof to said work turning head member, a highly flexible axial extension on the other extremity of said rod, and torque indicating means operatively connected to the free extremity of said highly flexible rod extension which is displaced responsive to applying force to said handle means, said flexible rod extension being sufficiently inflexible to transfer normal loads on said work turning head member to said torque indicating means and sufficiently flexible to yield responsive to abnormal loads to serve as shock absorbing means, said torque indicating means including instrumentalities for operating a shaft, a dial rotatively mounted on said handle member for movement relative to said shaft to enable calibration and facilitate reading of said indicating means, said dial being normally stationary on said handle member, a pointer frictionally mounted on said shaft for rotation relative to or with said shaft, and a pin anchored in said dial to engage the free extremity of the pointer for rotative resetting responsive to rotary dial displacement.

15. In a torque wrench, the combination with a handle member, of a work turning head member journalled in said handle member, torque resisting means interposed between said handle member and said work turning head member, said torque resisting means including an elongated rod anchored at one extremity thereof to said work turning head member, a highly flexible axial extension on the other extremity of said rod, and torque indicating means operatively connected to the free extremity of said highly flexible rod extension which is displaced responsive to applying force to said handle means, said flexible rod extension being sufficiently inflexible to transfer normal loads on said work turning head member to said torque indicating means and sufficiently flexible to yield responsive to abnormal loads to serve as shock absorbing means, said torque indicating means including instrumentalities for operating a shaft, a dial rotatively mounted on said handle member for movement relative to said shaft to enable calibration and facilitate reading of said indicating means, said dial being normally stationary on said handle member, a pointer frictionally mounted on said shaft for rotation relative to or with said shaft, a pin anchored in said dial to engage the free extremity of the pointer for rotative resetting responsive to rotary dial displacement, signal means on said handle member, an electrical energy source for said signal, and an electrical circuit including said dial pin and pointer to energize said signal when said dial pin and pointer engage responsive to applying a predetermined torque to said turning head commensurate with the presetting of said torque indicating means.

16. In a torque wrench, the combination with a handle member, of a work turning head member operatively connected to said handle member, torque resisting means interposed between said handle member and said work turning head member, said torque resisting means including a rod anchored to said work turning head member, a highly flexible axial extension adjustably connected to the other extremity of said rod, calibrated indicating means on said handle member and operatively connected to an extremity of said highly flexible rod extension to measure the displacement of said torque resisting means, said flexible rod extension being sufficiently inflexible to transfer normal loads on said work turning member to said torque indicating means and sufficiently flexible to yield responsive to abnormal loads to serve as shock absorbing means, said calibrated indicating means including instrumentalities for operating a shaft, a dial disposed relative to said shaft, and a pointer mounted on said shaft for rotation with said shaft.

17. In a torque wrench, the combination with a handle member, of a turning head member operatively connected to said handle member, torque resisting means interposed between said handle member and said turning head member, said torque resisting means including a rod extending from said turning head member for displacement responsive thereto, a highly flexible spring wire extension longitudinally adjustable on the other extremity of said rod, calibrated indicating means on said handle member and operatively connected to an extremity of said highly flexible rod extension to measure the displacement of said rod responsive to said turning head member, said flexible rod extension being sufficiently inflexible to transfer normal loads on said turning head member to said calibrated indicating means, said calibrated indicating means including instrumentalities for operating a shaft, a dial disposed relative to said shaft, and a pointer mounted on said shaft for rotation therewith responsive to the displacement of said rod and extension.

KENNETH R. LARSON.
GEORGE M. WALRAVEN.